March 21, 1939.  H. HURTER ET AL  2,151,405
TINE FOR DEEP JUICE GROOVES
Filed Nov. 22, 1937  2 Sheets-Sheet 1
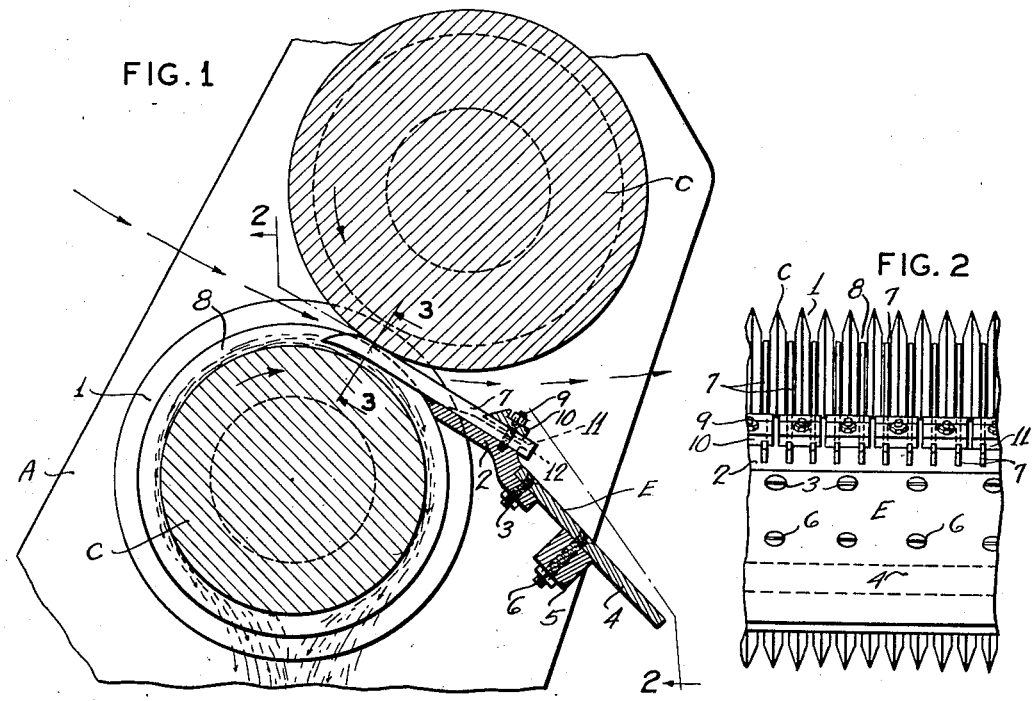
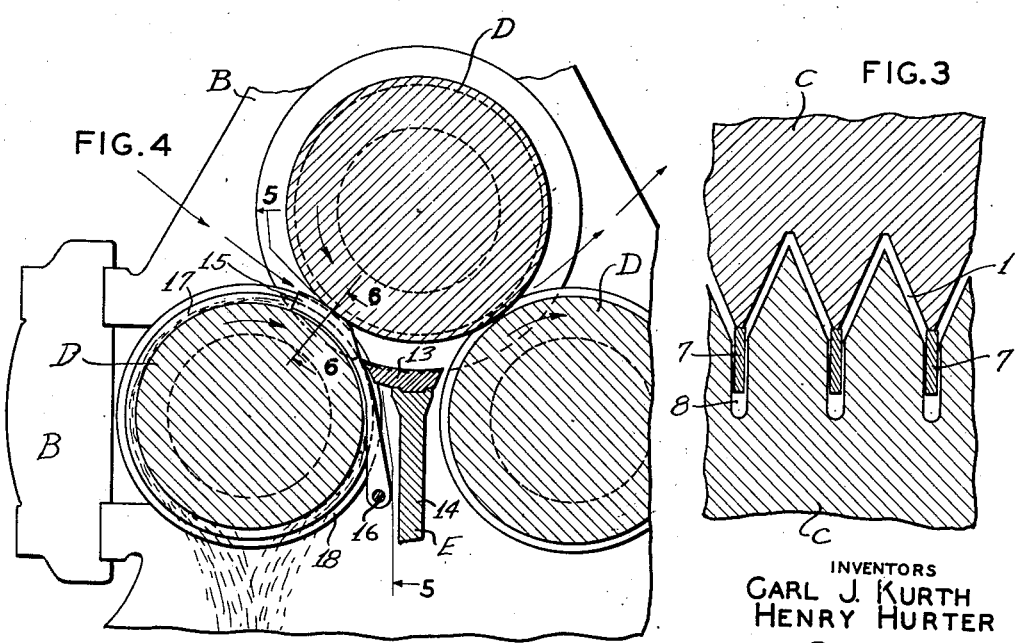
INVENTORS
CARL J. KURTH
HENRY HURTER
BY J.H.G. Cook
ATTORNEY March 21, 1939.    H. HURTER ET AL    2,151,405
TINE FOR DEEP JUICE GROOVES
Filed Nov. 22, 1937    2 Sheets-Sheet 2

INVENTORS
CARL J. KURTH
HENRY HURTER
BY *J. H. G. Cook*
ATTORNEY

Patented Mar. 21, 1939

2,151,405

UNITED STATES PATENT OFFICE 2,151,405

TINE FOR DEEP JUICE GROOVES

Henry Hurter and Carl J. Kurth, St. Louis, Mo., assignors to Fulton Iron Works Company, St. Louis, Mo., a corporation of Delaware Application November 22, 1937, Serial No. 175,832

1 Claim. (Cl. 100—47)

Our invention relates broadly to tines for deep liquid grooves, and more particularly to a method and apparatus for preventing the clogging of deep, liquid-receiving grooves, circumferentially placed in the pressure grinding rolls of a mill for extracting liquids from a liquid-containing material. In mills of this type, such, for instance, as sugar cane grinding mills and mills for extracting a large percentage of the liquid from straw to be made into strawboard, and any other material to be dehydrated, it is important that the liquid extracted by the pressure grinding rolls should be speedily and uninterruptedly removed from the pressing zone of the mechanism.

In sugar cane grinding mills it is customary to employ a pre-crushing set of two rolls in advance of a series of 3-roller mills. The purpose of these mills is to extract from the sugar cane as it passes through the grinding rolls the juice and sucrose contained in the cane. Trouble is usually encountered in the 3-roller mills by reason of the clogging of the deep juice grooves (usually termed "Messchaert" grooves) circumferentially placed in the two lower grinding rolls. The cane is broken up by the intense pressure which is necessary to liberate the juice and the sucrose material, and a considerable quantity of such broken up cane is pressed into the juice grooves of the lower grinding rolls of each mill, some of which passes into the juice-receiving pan under each mill, and some into the deep juice grooves of the lower grinding rolls. This material, which is ordinarily termed "trash", must be removed, or scraped, from the grooves of the lower grinding rolls, and it is and has been the custom to provide turnplates, or trash knives, in such mills for this purpose. These trash knives are really scrapers intended to remove the waste material from the juice grooves of the lower pressure grinding rolls. Many mills of this type have the two lower pressure grinding rolls circumferentially grooved with a series of relatively shallow, as well as a series of relatively deep, juice grooves for receiving juice extracted from the cane and conveying said juice to a juice-receiving pan underneath each mill. It is customary to provide scraper tips on the trash knives which enter the deep juice grooves for the purpose of removing any accumulated trash from such grooves. In every instance, however, so far as we are aware, such scrapers have not been applied in the pressure zone of the mill, for the obvious reason that such scrapers can only operate outside of such pressure zone.

By our invention we provide tines adapted to lie in the deep juice grooves, which tines lie in the pressure zone of the mill and are adapted to prevent the entry of any substantial amount of trash into such grooves. These tines deflect the trash from the grooves and cause the same to proceed with the rest of the refuse material to the discharge end of the cane mill. By this means the trash is not delivered to the juice-receiving pans underneath the mill and therefore does not have to be strained from such juice.

It is customary in cane-grinding mills to pump the juice collecting under a mill to the top of the cane mat in front of the preceding mill, and the trash contained in said juice tends to cause the second mill to "slip"; that is, by virtue of its fineness, wetness, and slipperiness, it tends to cause the mill to be slow in gripping the cane mat, and therefore chokes and slows down the production of the mill.

By our invention we practically eliminate the collection of trash in the deep juice-receiving grooves, which is highly important in the types of mills to which reference has previously been made.

Fig. 1 is a transverse vertical section taken through a pre-crusher of two rolls.

Fig. 2 is an elevational view of the scraper with tines mounted thereon and crusher roll taken on line 2—2 of Fig. 1.

Fig. 3 is an enlarged, detail section on line 3—3 of Fig. 1.

Fig. 4 is a transverse vertical section taken through a 3-roller mill, showing tines associated with the front, or feed, roll.

Figure 7:
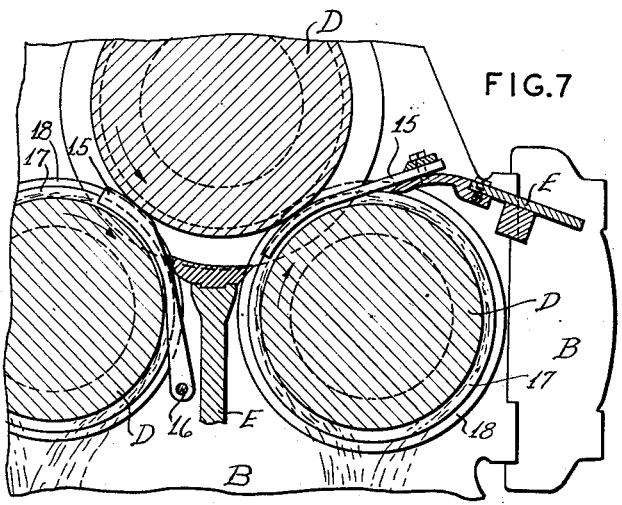
Figure 8:
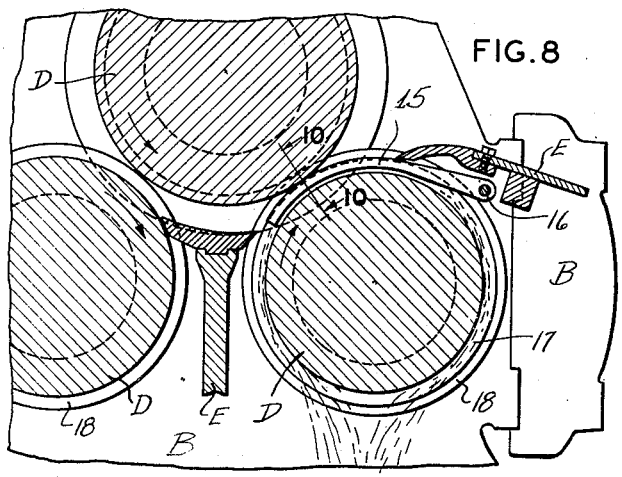
Figure 9:
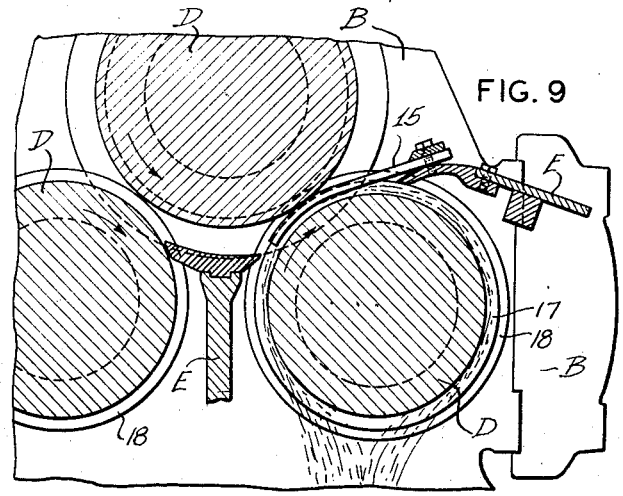

Figs. 7, 8, and 9 are transverse vertical sections of modified forms of tine mounting.

Figure 10:
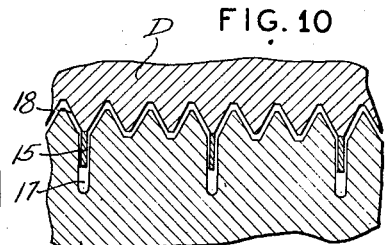

Fig. 10 is an enlarged, detail section as viewed along line 10—10 of Fig. 8.

Referring particularly to Figs. 1, 2, and 4 of the drawings, A designates one housing for the two-roller, pre-crusher, and B designates a housing for the 3-roller grinding mills. There are two each of the housings A and B, respectively, one of each on each side of the mill. C designates the pre-crusher rolls and D the mill grinding rolls.

The trash knife, designated generally by the letter E, shown in Fig. 1, is located at the discharge side of the precrusher rolls C and contacts the shallow grooves 1 in the periphery of the lower crusher roll. The trash knife E is formed of a relatively flat member 2 extending the length of the rolls, and is bolted as at 3 to a supporting member 4, which also extends the length of the crusher rolls. The member 4 is in turn mounted on a support 5, preferably by bolts 6, which support is carried by the housing A. To the upper surface of the flat member 2 are fastened the tines 7, which lie in the deep juice-receiving grooves 8 in the periphery of the lower crusher roll C. These tines 7, as shown, are mounted on the upper side of the flat member 2 and held thereon by bolts 9 which pass through perforated sections 10, which also serve as spacers for the tines 7, as shown particularly in Fig. 1 in dotted lines as at 11. Additional spacers 12 for the tines 7 are also carried by the flat member 2 of the trash knife E.

As seen in Fig. 1, the teeth of the trash knife E enter the shallow grooves 1 of the lower crusher roll C, while the tines 7 enter the deep juice grooves 8 of said roll. As the cane or other liquid-containing material enters the bight of the rolls C, the scraping of said material along the upper surface of the tines 7 tends frictionally to pull said tines upwardly toward the top roll C, and thus said tines do not drop into the bottom of the deep juice grooves 8 and obstruct the relatively free flow of liquid downwardly through said deep juice grooves into a juice pan, not shown. As shown in Fig. 1, there is a substantial space between the lower faces of the tines 7 and the bottom of the deep juice groove 8.

Referring more particularly to the 3-roller mills shown in Figs. 4 to 10, inclusive, the trash knife E consists of a toothed plate 13 mounted on a support 14, which is in turn carried by the housings B. The tines 15 are independently mounted on a rod 16 also carried by the housings B. The tines 15 are movable vertically by being pivotally mounted on said rod 16, and said tines are located in the deep juice grooves 17 of the front or feed lower roll D. The teeth of the plate 13 enter the shallow grooves 18 on the lower roll D and serve as scrapers therefor. As the moving mass of material passes through the mill rolls D, it scrapes over the tines 15 and the plate 13, thereby causing said tines and plate to be lifted by the friction of said moving mass, and thus the deep juice grooves are relatively unobstructed to the passage of juice therethrough.

In Fig. 7 we have shown the trash knife E and tines 15 placed on both of the feed and discharge bottom rolls D.

Figure 5:
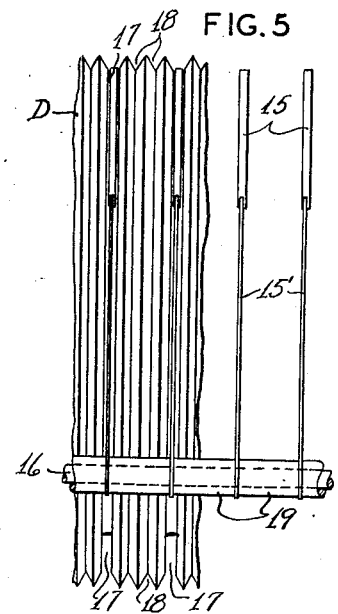
Fig. 5 is an elevational view of the mill roll and tines associated therewith taken on line 5—5 of Fig. 4.

In Fig. 5 we have shown the mounting of the tines 15 on the rod 16. The portions 15' of the tines 15 are mounted on the rod 16 and separated by spacers 19, also mounted on said rod 16.

Figure 6:
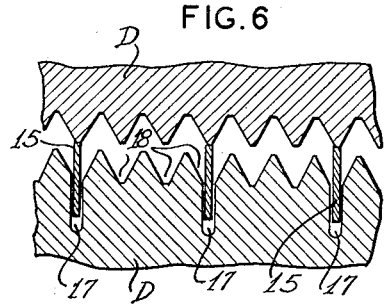
Fig. 6 is an enlarged, detail section as viewed along line 6—6 of Fig. 4.

In Fig. 6 we have shown the tines 15 as they appear in elevated position in the deep grooves 17, when material is passing between the mill rolls D.

In Figs. 8 and 9 we have shown the tines 15 applied only to the lower rear discharge roll D, while two trash knives E are employed, one for each lower roll.

In Fig. 10 we have shown the rolls D of a cane mill, which rolls are in a set placed near the discharge end of a cane mill, and the upper and lower rolls D are closer together than they are at the front end of said mill.

By our method of locating the tines in the deep juice grooves of the crusher and mills in the pressure zone of such crusher and mills, we prevent the entry of a great proportion of the fine trash into the deep juice-receiving grooves, so that said grooves may properly function to quickly draw off the juice squeezed out of the material passing through said crusher and mill. We also prevent the accumulation of any substantial amount of trash in the juice-receiving pans located under each mill and also under the crusher.

We claim:

The combination with a machine including co-acting pressing rolls wherein one of the pressing rolls has deep juice-receiving grooves in the pressing surface thereof, of tines, said tines consisting of relatively narrow blades adapted to enter the juice-receiving grooves, said grooves having greater depth and width than said tines, and means for supporting said tines to retain the tines in a position in advance of, in, and at the rear of the pressure zone of said grooved roll, in, and within the grooves, the support for said tines being mounted at the discharge side of said roll, the construction of the co-acting roll with relation to the grooved roll being such that the lower surface of the tine cannot be forced thereby into contact with the lower surface of the groove.

HENRY HURTER.
CARL J. KURTH.